United States Patent Office

3,138,147
Patented June 23, 1964

3,138,147
CONTROL SYSTEM FOR INTERNAL
COMBUSTION ENGINE
Paul A. Bancel, Montclair, N.J., assignor to Ingersoll-Rand Company, New York, N.Y., a corporation of New Jersey
Filed Dec. 22, 1961, Ser. No. 161,536
7 Claims. (Cl. 123—103)

The present invention relates to a speed control system for internal combustion engines and more particularly to an improvement in the control system for internal combustion engines as described in my Patent No. 2,714,881, issued on August 9, 1955.

The regulator shown in that patent opens or closes air valves which control the supply of air to the engine cylinders. As stated the regulator can be piloted or actuated in response to either the fuel gas pressure or the manifold air pressure of a four cycle engine supercharged by an exhaust turbine driven air compressor, commonly called a turbo-charger. This invention refers to regulators operating with air pressure as the basic sensing or piloting means.

Experience has shown several practical advantages for this choice. For one thing the air pressure reflects the load on the engine and the amount of heat energy injected in the form of fuel gas, regardless of its specific value per cubic foot. The heat value per unit volume of a combustion gas may vary widely. For example that of propane mixtures may be 2½ times that of methane; other fuels may have half or less that of methane.

The result is a very wide range in the fuel gas pressure required to inject the gas volume required to supply the heat for any given engine load. When the regulator for the air valves is piloted by manifold air pressure its response is not affected by changes in the specific heat content of the gas.

On engines of improved combustion chanker design equipped with a turbo charger the cylinders operate with a large margin of excess air at all usual loads. When the load is about 25% or higher the fuel injected can therefore be suddenly increased by 25% or more without danger of stalling the engine because the necessary oxygen for combustion of the increment of fuel already exists within the cylinders. Thereafter in a matter of seconds the turbo charger which is driven by the energy in the exhaust gases speeds up in response to the additional heat energy (in the exhaust gases) provided by the increased fuel supply. The result of the higher speed is higher air pressure in a matter of a few seconds. This in turn pilots the regulator to cause opening of the air valves so that the reduced restriction combined with the higher supply pressure establishes a new condition of air supply at the desired excess proportion to the new fuel supply.

However, experience has shown that excess air above that which is needed for a chemically correct mixture cannot be permitted while the engine is idling or operating at low loads. Frequently good idling calls for even less than the chemically correct mixture. One reason for this is that at idle or light loads, the engine operates at a high vacuum within the cylinders. Thus the exhaust products retained in the clearance space of the cylinder from the previous combustion process are greatly expanded on the succeeding suction stroke and occupy a large volume before any new air supply can be inhaled (obviously if the vacuum was high enough the cylinder contents would consist of exhaust gases exclusively and no new air supply would be sucked in). As a result, the mixture in the cylinder at the time of combustion of the next cycle contains a relatively large amount of exhaust gases from the previous combustion process. Thus the oxygen to be used for combustion in the next cycle is not only diluted by the nitrogen accompanying the oxygen in the air supplied to the cylinder, but it is also diluted by the added nitrogen (and combustion product) retained in the clearance space of the cylinder. An additional dilution with nitrogen from an excess air supply would result in failure of combustion. Successful idling is frequently accompanied by a supply of excess fuel and minimum oxygen commonly called an over-rich mixture. The hydrogen in the fuel is burned but part of the carbon is burned to carbon monoxide instead of carbon dioxide. Thus while operating with the low oxygen supply to the cylinders, an increase in fuel without sufficient oxygen will cause failure of combustion because there is no oxygen available for the chemical combination. This causes the engine to stall.

It is also to be noted that a small increment of load may result in a very large percentage increase in fuel consumption. For example, the total fuel supply at idle may be 20% of the normal supply and an increase to 30% would represent only a small increment of load but would require a 50% increase over the previous fuel supply and a demand for 50% increase in oxygen supply. The transition from idle is therefore extremely exacting as to simultaneous changes of air and fuel supply.

It is the general object of this present invention to avoid and overcome the foregoing and other difficulties of and objections to prior art practices by the provision of a regulator device which will close the air valves to the cylinders sufficiently to provide the proper air for idling and low load while at the same time being capable of detecting an increase in the fuel supply to thereby cause the air intake valves to open to a point where sufficient air is made available to prevent stalling when the fuel supply is increased.

Another object of this invention is to provide an improvement to my aforesaid patent by providing a control system which anticipates air supply requirements to an engine to prevent stalling when the fuel supply is increased.

Still another object of the present invention is a provision of a rapid response control system for an internal combustion engine which is operable only at lower operating load conditions of the engine.

Yet another object of the present invention is the provision of a control system for an internal combustion engine which provides effective speed control over the entire load range of the engine.

The aforesaid object of the present invention and other objects which will become apparent as the description proceeds are achieved by a novel arrangement of a fluid pressure operated regulator connected to actuate air intake valves to the engine cylinders, whereby the regulator is actuated to open the air supply valves to the engine in response to the rate of fuel supply to the engine over the lower load range of operation of the engine.

For a better understanding of the present invention reference should be made to the accompanying drawings, wherein like numerals of reference indicate similar parts throughout the several views and wherein.

Although the principles of the present invention are broadly applicable to an internal combustion engine, the present invention is particularly adapted for use in controlling a four cycle internal combustion engine operating with a gaseous type fuel supply.

Since the present invention relates to an improvement of my aforesaid patent, a detailed description of the operation of the control system in that patent will not be repeated here. However, since an understanding of certain features in that patent would be helpful in understanding the present invention, a brief description of the operating features covering the control system in the patent will be repeated.

Figure 1:
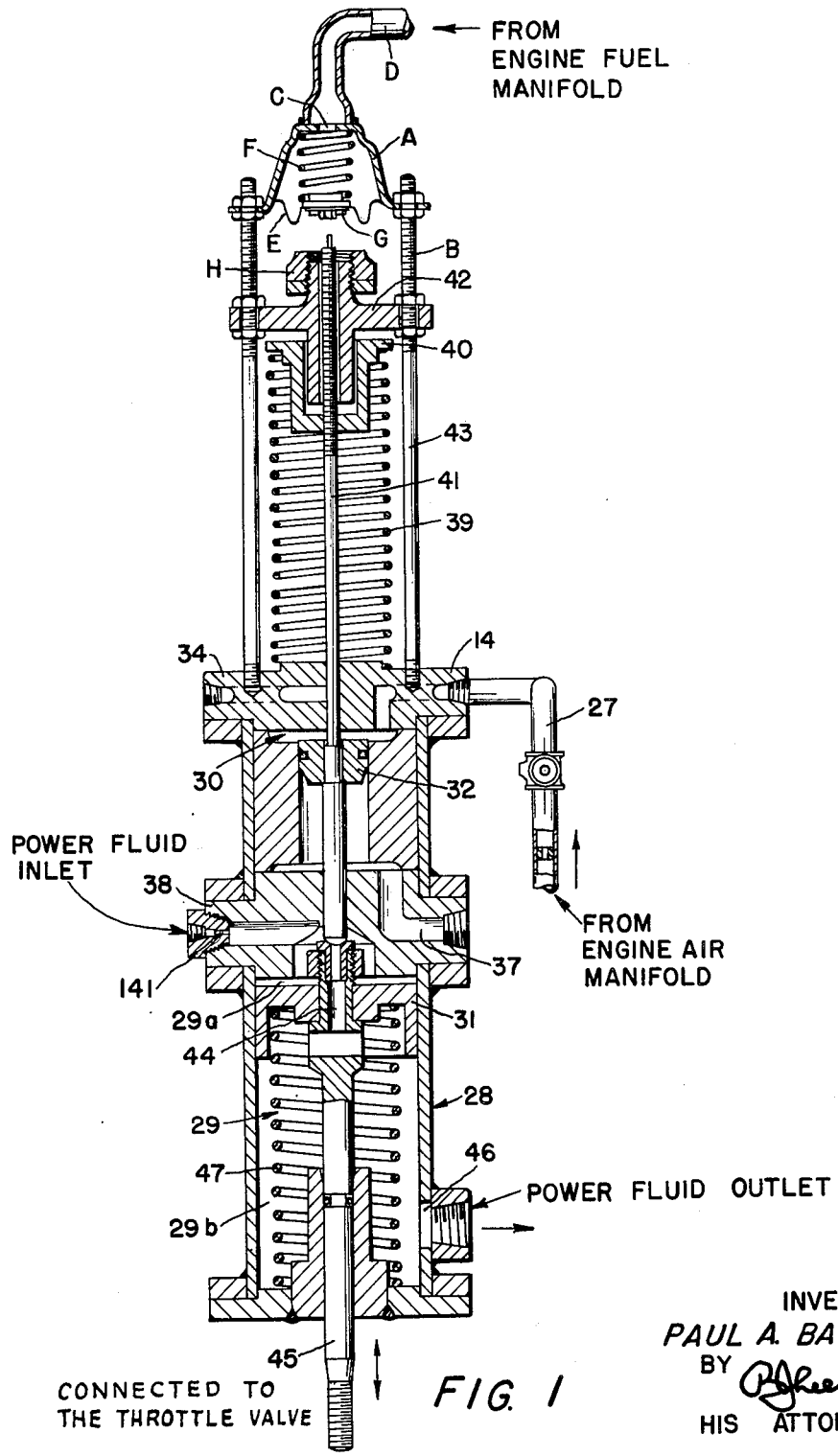
FIGURE 1 is a longitudinal sectional view of a regulator valve for actuating the air inlet valves of an internal combustion engine showing the improved control system of the present invention.

With specific reference to the form of the present invention illustrated in the drawings and referring particularly to FIGURE 1 the control regulator used in the present invention is indicated generally by the reference numeral 14. The features of this regulator are described in detail in my aforesaid patent and only those features deemed necessary to understand its operation will be repeated here.

The regulator 14 includes a pilot chamber 30 and a pilot piston 32 (FIGURE 1). The pilot piston 32 is urged in one direction (downward as viewed in FIGURE 1) by pressure fluid conducted from the engine air manifold 15 through conduit 27 to the pilot chamber 30. The fluid pressure in the pilot chamber 30 acts one one side of the pilot piston 32 tending to urge the pilot piston 32 downwardly as viewed in FIGURE 1. The opposite side of the pilot piston 32 is in communication with the atmosphere through a passage 37. The pressure from the engine air manifold 15 exerted on the pilot piston 32 is resisted by a spring 39 biased between an end cover 34 and a spring retainer 40 threaded on an end portion of a piston rod 41. The piston rod 41 extends through and is affixed to the pilot piston 32. With this arrangement the pilot piston 32 is actuated in response to variations in pressure in the air manifold 15 of the engine.

The lower (as viewed in FIGURE 1) or opposite end of the piston rod 41, which end extends slidably through a partition 38, serves to control the pressure of power fluid acting on the upper face of the power piston 31. The power piston 31 is movable within the cylindrical casing 28 and separates the upper portion 29a of the power chamber 29 from the lower portion 29b. A spring 47 between the underside of the power piston 31 and the end cover 48 tends to urge the power piston in an upward direction as viewed in FIGURE 1. A continuous supply of power fluid for actuating the power piston 31 is supplied to the upper portion 29a of power chamber 29 through an orifice 141 and is exhausted from the upper portion 29a of the power chamber 29 through a passage 44 formed in a piston rod 45. The lower portion 29b of the power chamber 29 is in communication with the passage 44 and the atmosphere through an opening 46 in casing 28 whereby the power pressure fluid flowing from the upper portion 29a of the power chamber 29 through the passage 44 into the lower portion 29b of the chamber 29 is exhausted through the opening 46 to the atmosphere. The piston means is comprised of the piston rod 41, the pilot piston 32, and the power piston 31.

Thus it can be seen that the movement of the pilot piston 32 which is connected to the piston rod 41, controls the movement of the power piston 31, since the lower end of the piston rod 41 is arranged coaxially with the mouth of the passage 44 such that the movement of the piston rod 41 towards the power piston 31 tends to reduce the flow of pressure fluid through the passage 44 and thereby increase the pressure in the upper portion 29a of the power chamber 29. Movement of the piston rod 41 away from the power piston 31 increases the flow of pressure fluid through the passage 44 and thereby decreases the pressure in the upper portion 29a of the power chamber 29. Thus the power piston 31 assumes a position relative to the piston rod 41 such that the force exerted on the power piston 31 by the power fluid in the upper portion 29a of the power chamber 29 acting against the upper face of the power piston 31 equals the force exerted by the spring 47 biased between the power piston 31 and the end cover 48.

Figure 2:
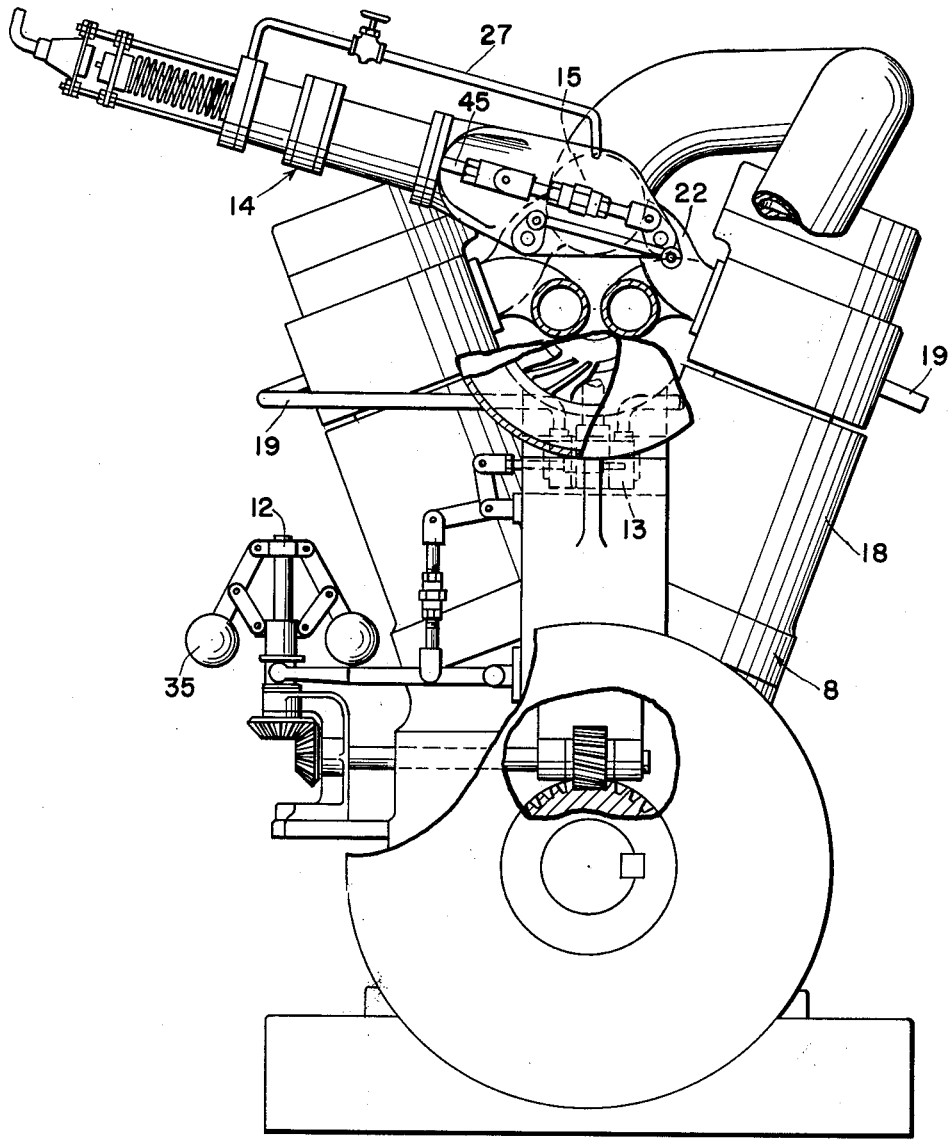
FIGURE 2 is an end view of an internal combustion engine showing the regulator valve of FIGURE 1 installed on the engine.

For example, when the load on the engine 14 is increased, the air pressure in the air manifold 15 will be increased. This increase of air manifold pressure is transmitted to the top face of the pilot piston 32 by the conduit 27. The pilot piston 32 accordingly moves downward until the force exerted by the spring 39 increases to counterbalance the increase in air pressure. The downward movement of the piston 32 moves the piston rod 41 to restrict the flow of fluid through the passage 44. The resulting decrease of flow through the passageway 44 results in an increase in pressure of power fluid within the upper portion 29a of the power chamber 29 acting against the upper face of the power piston 31 thereby moving the power piston 31 downwardly. Movement of the power piston 31 downwardly also moves the piston rod 45 downwardly which in turn operates to open the air intake valves (not shown), located in the branch pipes, leading from the air manifold 15 to the individual engine cylinders (FIGURE 2).

The above description follows generally the description in my aforesaid Patent No. 2,714,881. The invention here relates to an improvement of the above.

The present invention includes control means comprising a diaphragm and spring arrangement (FIGURE 1) in which a diaphragm E is movable in response to pressure in the fuel manifold 19. The spring and diaphragm arrangement consists of a member A forming an enclosure supported at the top of the regulator 14 by means of studs B. The enclosure has an opening C leading to a conduit D which is connected to the fuel manifold 19 of the engine. The member A has another opening which is closed off by a diaphragm E secured at its outer extremities to the member A and mounted such that the diaphragm E is movable towards and away from the member A in response to pressure (or vacuum) within the member A acting on the diaphragm E. Inside the member A is a spring F tending to urge the diaphragm member E away from the member A.

The pressure (or vacuum) in the fuel manifold 19 varies as the output of the engine 8, whereby at lower loads there is less pressure in the fuel manifold 19. For example, at zero output the vacuum in the fuel manifold 19 may be six pounds per square inch absolute and as the load increases the vacuum will decrease until there will be positive pressure in the fuel manifold 19.

The above described diaphragm and spring arrangement is designed to anticipate air supply requirements to satisfy fuel increases brought about by an increase of load imposed on the engine 8. The control means is operatively connected to the regulator 14 and is operable to actuate the regulator 14 in response to the rate of fuel supply to the engine. The force of the spring F is designed to push against the diaphragm E thereby causing a plate G secured to the diaphragm E to bear against the end of the piston rod 41 (FIGURE 1) to move the piston rod 41 downwardly. Such movement of the piston rod 41 decreases the flow of fluid through the passage 44 and thereby moves the power piston 31 downwards to operate the piston rod 45 to cause it to move downward to operate to open air intake valves (not shown) to the engine cylinders 18 (FIGURE 2). However, the force of the spring F is opposed by the action of the diaphragm E, the diaphragm E being exposed to the vacuum within the member A which communicates with the fuel manifold 19. Thus the vacuum in the fuel manifold 19 at low operating loads of the engine causes the diaphragm E to move upwards as shown in FIGURE 1 to overcome the force of the spring F and thereby lift the plate G out of contact with the piston rod 41. However, an increase of fuel supply decreases the vacuum (and increases the pressure) in the fuel manifold 19 and this reduced pressure is communicated to the member A. Thus with less vacuum acting on the diaphragm E, the spring F moves the diaphragm E downwardly (FIGURE 1) to thereby cause the piston rod 41 to also move downwardly and to open the air intake valves (not shown) to allow more air to the cylinders 14.

For example, on an engine 8 (FIGURE 2) having air intake valves (not shown) of the butterfly type leading to each cylinder 18, the air intake valves (not shown) may be constructed whereby such air intake valves are closed when they are at an angle of 15° to a cross sectional plane of the air intake conduit 22. When the engine 8 is idling and these valves (not shown) are closed, small holes (not shown) drilled in the valve disc allow air for idling to flow to the cylinders 18. When the engine is idling with the air intake valves (not shown) closed and air flowing through such holes (not shown), the vacuum from the fuel manifold 19 acting on the diaphragm E would be sufficient to overcome the force of the spring F acting on the diaphragm E thus moving the plate G out of contact with the piston rod 41 and permitting the piston rod 45 to move upwardly with attendant movement of the air intake valves (not shown) to their proper closed position of 15 degrees. However, an increase of load on the engine 8 will immediately reduce the vacuum acting on the diaphragm E due to the increased pressure in the fuel manifold 19 to thereby allow the spring F to expand and move the plate G against the piston rod 41 and cause the air intake valves (not shown) to open. The amount of movement of plate G and the degree of opening of the air intake valves (not shown) is proportional to the change in the pressure in the fuel manifold 19 and can be controlled by the suitable selection of the spring tension of the spring F. An adjustable stop nut H threaded on an extension of a guide member 42 may be adjusted to limit the movement of the piston rod 41 by the plate G. Thus it would be sufficient, for example, to adjust the stop nut H so that the plate G would only move the piston rod 41 just enough to open the air intake valves (not shown) to approximately 23 degrees. As previously explained, load anticipation at higher operating loads is not required and since an opening of 23 degrees corresponds to the opening of these air intake valves (not shown) encountered at the higher loads, the problem of stalling is prevented since at openings of the air valves (not shown) greater than 23 degrees, the necessary excess air (to provide sufficient air when loads are applied to the engine) is always available. At higher loads of the engine 8, the movement of the piston rod 41 will not be effected by the movement of the spring F and the diaphragm E since the end of the piston rod 41 will not operate at points beyond the upper surface of the stop nut H.

Thus it can be seen from the above description that the regulator 14 will close the air intake valves (not shown) to provide the proper air for idling and low loads. However, when an increase of load is applied to the engine 8 it is immediately detected in the fuel manifold 19 and this is used to immediately move the piston rod 41 in the regulator 14 to cause the air intake valves (not shown) to open to a point where sufficient air is made available to prevent stalling.

Figure 3:
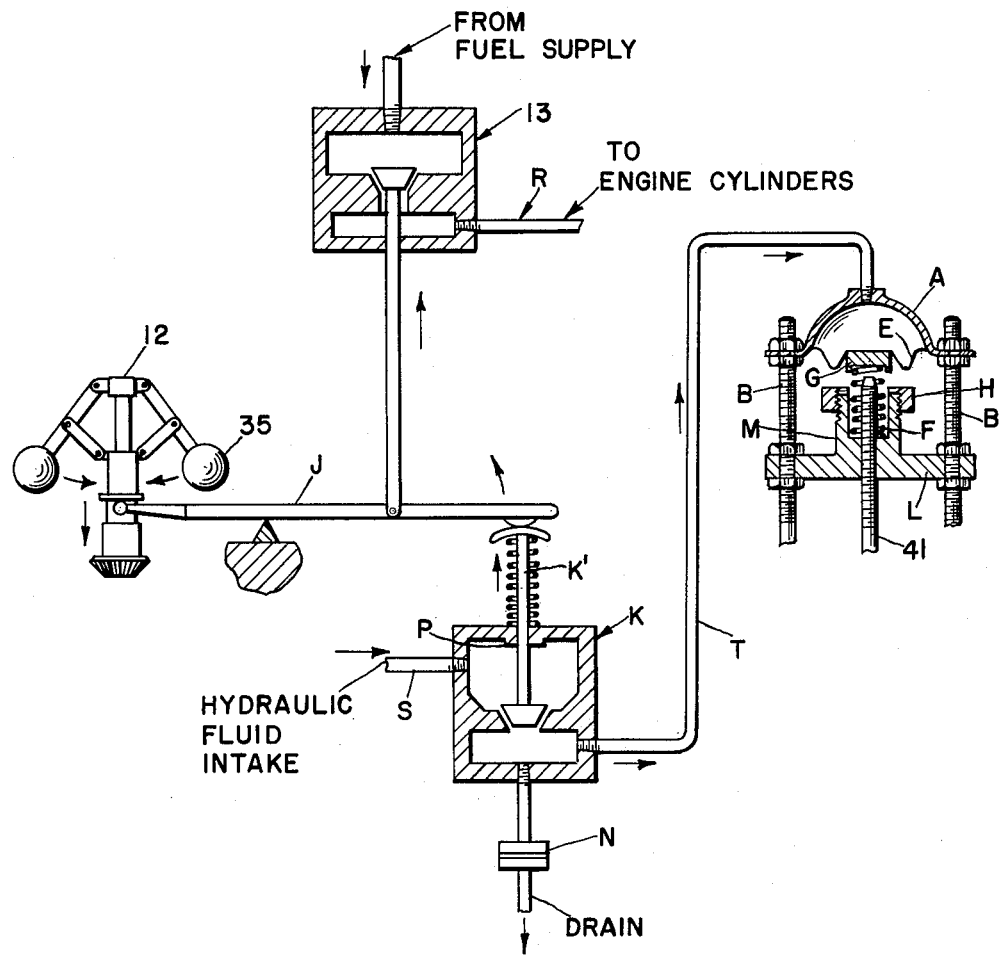
FIGURE 3 is a schematic view of an alternative arrangement of the control system of the present invention which is hydraulically operated.

It will also be recognized by those skilled in the art that hydraulic pressure may also be used to operate the diaphragm and spring arrangement as shown in FIGURE 3.

Referring to FIGURE 3 a governor 12 is driven by the engine and arranged to actuate a fuel valve 13 for controlling the flow of fuel to the engine 8 in response to variation in the speed of the engine. The pivotal governor lever J by which the governor 12 operates the fuel valve 13 may also be used to actuate fluid supply means which includes a needle valve K to control hydraulic pressure to the diaphragm and spring device on the regulator 14. With this arrangement the diaphragm and spring arrangement is modified as shown in FIGURE 3 so that the spring F is located on the under or atmospheric side of the diaphragm E and a retainer plate L is disposed between the studs B of the regulator 14 to provide firstly a seat for the spring F, and secondly an extension piece on which the adjustable stop nut H is threaded.

The needle valve K is provided with a drain orifice N whereby, by the proper selection of the size of the drain orifice N and the proper profile of the needle valve K, it is possible to obtain any desired rate of increased hydraulic pressure and corresponding movement of the plate G to suit the rate of opening of fuel valve 13. Needle valve K has a shoulder stop P to limit the stroke of needle valve K thereby permitting the continuous use of the governor lever J even after the stroke of the needle K is completed to full open and a stem K¹ of the needle valve K rests against the shoulder stop P.

The operation of the embodiment shown in FIGURE 3 is as follows. As additional load is applied to the engine 8, its speed tends to decrease. This decrease in speed causes flyweights 35 to move inwardly with attendant downward movement of the left hand end of the governor lever J and resultant opening of the fuel valve 13 and the needle valve K. The now open fuel valve 13 permits a greater quantity of fuel to flow through the conduit R to the engine cylinders 18. The now open needle valve K allows the hydraulic fluid supplied to the needle valve K through the inlet conduit S to flow through the outlet conduit T thereby increasing the pressure within the enclosure member A. This increased pressure within enclosure member A moves the diaphragm E away from the enclosure member A to thereby cause plate G to move the piston rod 41 downwardly with attendant opening of the air intake valves (not shown) and resultantly supplying additional air to the engine cylinders 18.

It will be recognized by those skilled in the art that the objects of the present invention have been achieved by the provision of an engine control system which will permit the air intake valves to the engine cylinders to be closed sufficiently to provide the proper air for idling and low load while at the same time being capable of detecting an increase in the fuel supply to thereby open air intake valves to a point where sufficient air is made available to prevent stalling when the fuel supply is increased. The improved control system is operable as a rapid response control system at lower operating load conditions of the engine where it is most needed to thereby provide effective speed control over the entire load range of the engine.

While in accordance with the patent statutes one best known embodiment of the present invention has been illustrated and described in detail, it is to be particularly understood that the invention is not limited thereto or thereby.

I claim:

1. The combination with an internal combustion engine having a regulator and air valve means operatively connected to said regulator, the improvement comprising control means operatively connected to said regulator and operable in response to the rate of fuel supply to actuate said regulator, said regulator then being operable to open said air valve means, said control means including a flexible member movable in response to an increase in fuel pressure to actuate said regulator over the lower portion of the operating range of said engine, and adjustable stop means for limiting the movement of said flexible member.

2. The combination with an internal combustion engine having fuel manifold means, a regulator, and air valve means operatively connected to said regulator, the improvement comprising control means operatively connected to said regulator and operable in response to the pressure in said fuel manifold means to actuate said regulator, said regulator then being operable to open said air valve means, said control means including a flexible member, a housing extending at least over one side of said flexible member, resilient means tending to urge said flexible member in one direction, and a conduit between said fuel manifold means and said housing, said conduit being capable of transmitting sub-atmospheric pressure in the fuel manifold means to said housing to allow atmospheric pressure acting on an opposite side of said flexible member to urge the flexible member in an opposite direction.

3. For an internal combustion engine having a regulator, the combination comprising piston means movable in said regulator, air valve means for admitting air to said engine, said piston means being adapted to operate said air valve means, control means operatively disposed adjacent said piston means, fuel supply means for supplying fluid under pressure in response to variations in speed of the engine and adapted to actuate said control means in response to pressure in said fuel supply means whereby said control means actuates said piston means to open said air valve means to increase the air supply to the engine.

4. For an internal combustion engine having a regulator the combination of fluid supply means for supplying fluid under pressure in response to variations in speed of the engine, piston means reciprocable in said regulator, air intake valve means operatively connected to said piston means, control means adapted for operative engagement with said piston means and in communication with said fuel supply means, said control means being operative in response to an increase in fuel pressure in said fuel supply means to engage and cause movement of said piston means, thereby opening said air intake valve means to increase the air supply to said engine.

5. The combination with an internal combustion engine having a regulator and air intake valve means operatively connected to said regulator, the improvement comprising fluid supply means for supplying fluid under pressure in response to variations in speed of the engine, and control means in communication with said fluid supply means and operable in response to pressure in said fluid supply means to actuate said regulator to open said air intake valve means.

6. The combination with an internal combustion engine having a regulator, air valve means, and a fuel manifold, the improvement comprising control means for causing said regulator to open the air valve means in response to pressure in said fuel manifold, said control means including an enclosure member, a flexible member movable in response to pressure in said enclosure member, a conduit between said enclosure member and said fuel manifold, resilient means tending to urge said flexible member in one direction, said resilient means being adapted to move said flexible member to actuate said regulator to open the air valves when the force of the resilient means and the force of the pressure in the enclosure member acting on one side of the flexible member is sufficient to overcome the force of atmospheric pressure acting on the opposite side of said flexible member.

7. The combination with an internal combustion engine having a regulator, air intake valves, and a fuel manifold, the improvement comprising control means for causing said regulator to open the air intake valves over the lower operating load range of the engine, said control means including fluid supply valve means operable to supply fluid under pressure in response to variations in the speed of the engine, an enclosure member, conduit means between said fluid supply valve means and said enclosure member, a flexible diaphragm movable in response to pressure in said enclosure member, and resilient means tending to urge said flexible diaphragm in one direction, said flexible diaphragm being adapted to actuate said regulator valve to open the air intake valves when the force of the fluid pressure in said enclosure member acting on said flexible diaphragm is sufficient to overcome the force of the resilient means.

References Cited in the file of this patent
UNITED STATES PATENTS

| | | |
|---|---|---|
| 2,004,869 | Hogg | June 11, 1935 |
| 2,714,881 | Bancel | Aug. 9, 1955 |
| 2,896,598 | Reggio | July 28, 1959 |